April 8, 1958  F. H. MUELLER  2,829,667
LUBRICATED ROTARY PLUG VALVE
Filed June 1, 1954

INVENTOR:

Frank H. Mueller,
BY Cushman, Darby & Cushman
ATTORNEYS.

United States Patent Office 2,829,667
Patented Apr. 8, 1958

2,829,667

LUBRICATED ROTARY PLUG VALVE

Frank H. Mueller, Decatur, Ill., assignor to Mueller Co., Decatur, Ill., a corporation of Illinois Application June 1, 1954, Serial No. 433,476

7 Claims. (Cl. 137—246.15)

This invention relates to rotary plug valves, and more particularly to improvements in lubricated rotary plug valves of the type shown in United States Patent No. 2,653,791 to Mueller. This invention is a continuation-in-part of my copending application, Serial No. 252,703, filed October 23, 1951 now abandoned.

In the valve shown in the aforementioned patent, a circumferential groove is formed in one of the opposed surfaces of the plug and the valve seat adjacent both ends of the latter. Positioned in these grooves are O-rings, which provide end seals between the seat and plug at both ends of the seat. One or more longitudinal lubricant channels, in one of the opposed surfaces of the plug and the seat, extend between and connect the inner sides of the O-ring grooves. Thus, there is formed a closed lubricant system which includes the longitudinal lubricant channel, or channels, and the lubricant reservoir space in the O-ring grooves at the inner side of the rings therein.

When lubricant under pressure is introduced into this closed lubricant system, the O-rings are deformed by such pressure and squeezed into the corners formed by the outer side wall of their grooves and the surfaces opposite the grooves, to thus tightly seal the seat bore at both ends thereof. At the same time, the O-rings constantly tend to resume their original configuration, to thereby exert force on the lubricant and maintain pressure thereon. This lubricant-pressure-maintaining feature is extremely important in a lubricated plug valve, since adequate lubrication of the valve on turning movements of the plug will not be assured unless the lubricant channels are completely full of lubricant so that the latter can be wiped onto the sealing surface opposite the channel. With each turn of the plug, some of the lubricant is dissipated from the lubricant channels, but the channels are immediately replenished with lubricant from the aforementioned reservoirs by the pressure exerted on the lubricant by the O-rings.

In the aforementioned valve, the longitudinal lubricant channels are of relatively-small cross section, and since lubricant commonly used in rotary plug valves is relatively thick and viscous, the lubricant flows quite slowly under pressure. Hence, when one of the lubricant channels is exposed to a port, or to a false port, in either the plug or the valve casing, very little lubricant is extruded from the channel into the port by the pressure in the lubricant system. Nevertheless, some lubricant is lost by extrusion at each operation of the valve, so that eventually the lubricant in the system will need to be replenished. In some instances, however, it is highly desirable for a lubricated plug valve to operate over even longer periods of time without the necessity of replenishing the lubricant.

In some types of lubricated plug valves or ground key stops, lubricant is supplied to the channels from a lubricant chamber formed between the large end of the valve plug and a closure plug threaded into an enlarged section of the seat bore. This chamber holds a considerable quantity of lubricant, and after lubricant has been dissipated from the longitudinal lubricant channels by a large number of operations of the valve, a few turns of the closure plug are sufficient to again replenish the longitudinal lubricant channels with lubricant from the lubricant chamber. Quite obviously, if lubricant is to be maintained under pressure in a closed lubricant system, the closure plug must be sealed against loss of lubricant therefrom. Additionally, since one end of the seat bore is closed and sealed by the aforementioned closure plug, there is no necessity of providing a sealing O-ring between the opposed surfaces of the plug and its seat at that end thereof which is closed by the aforementioned closure plug.

Therefore, it is an object of this invention to provide a lubricated plug valve of the type shown in United States Patent No. 2,653,791 with means for interrupting communication between the longitudinal lubricant channels and the O-ring grooves whenever a channel is exposed to a port, or a false port.

By so interrupting such communication, when any longitudinal lubricant channel is exposed to a plug or a casing port, or false port, the pressure on the lubricant in the channel is relieved during such exposure, so that lubricant will not be lost from the system by pressure extrusion into such port. When the lubricant channel is moved away from exposure to a port, however, the lubricant pressure is reestablished, so that any lubricant lost from the channel by wiping action is immediately replenished from the reservoirs. The amount of lubricant lost by wiping action is very small, however, so that the system needs to be replenished with lubricant only after a very large number of operations of the valve.

It is another object of this invention to provide a valve of the aforementioned closure plug type with means for both sealing the closure plug and also maintaining pressure on the lubricant in the lubricant chamber.

Other objects and advantages of the invention will become apparent from the following description and accompanying drawings, in which.

Figure 1:
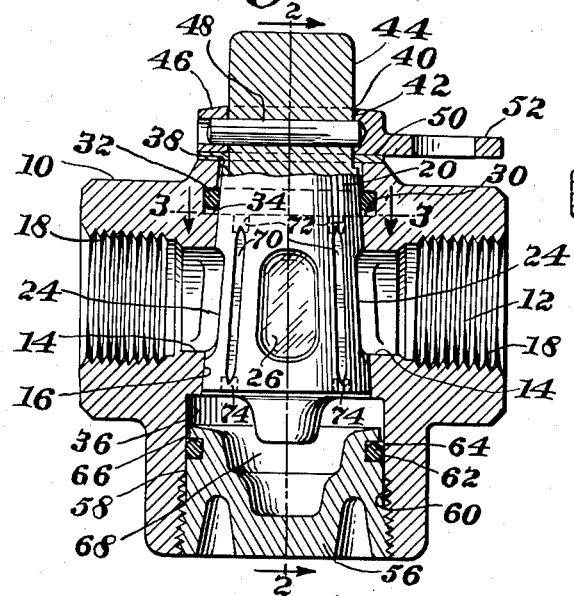
Figure 1 is a vertical sectional view through a lubricated rotary plug valve embodying this invention.

Referring now to the drawings, there is shown a rotary plug value embodying this invention. The valve has a casing 10 provided with a flow passage 12 having aligned ports 14 in a tapered plug seat 16 formed by a bore transversely intersecting the flow passage 12. As is usual, the outer ends of the flow passage 12 may be interiorly threaded, as at 18, for connection into a pipe line (not shown). Rotatably engaged with the valve seat 16 is a tapered valve plug 20 having a flow passage 22 provided with ports 24 at its opposite ends that are alignable with the casing or seat ports 14. Turning movements of the plug 20 in the seat 16 either align or disalign the plug ports 24 with the casing ports 14 to open or close the valve.

Preferably, the plug 20 and seat 16 are also provided with false or blind ports 26 and 28, respectively, spaced 90° from the plug and seat ports 24 and 14, respectively. The plug false ports 26 register with the seat ports 14, and the seat false ports 28 register with plug ports 24 in the closed position of the valve. In the open position of the valve, the plug false ports 26 register with the seat false ports 28. The provision of these false ports both reduces the area of metal-to-metal engagement between the plug 20 and its seat 16, to thus reduce resistance to turning movements of the plug, and eliminates prolonged exposure of any portions of the plug and seat sealing surfaces to corrosive action of the fluid controlled by the valve.

Figure 2:
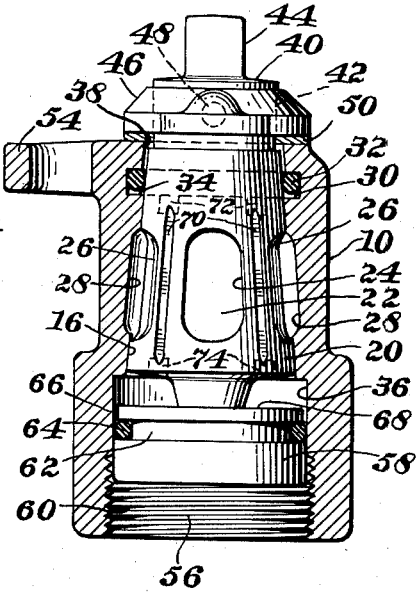
Figure 2 is a sectional view taken on line 2—2 of Figure 1.

The seat 16, at the smaller end thereof, is provided with a circumferential packing groove 30, preferably rectangular in radial section and opposed to the exterior surface of the valve plug 20. Disposed in the groove 30 is a resilient pressure-deformable packing ring 32, commonly known in the art as an "O-ring." The O-ring 32 is substantially circular in radial section when relaxed, but is of such a size that when it is positioned in its groove 30 it is compressed somewhat and contacts both the bottom of its groove and the opposed peripheral surface of the valve plug 20, to thus form an end seal between the opposed surfaces of the plug and its seat 16 at the small end of the latter. The groove 30, preferably, is somewhat wider than the O-ring 32, so that an annular space 34 exists between the inner side wall of the groove and the opposed side of the O-ring therein, as best shown in Figures 1 and 2. This space constitutes a lubricant reservoir, described more in detail hereinafter.

From the O-ring groove 30, the opposed surfaces of the plug 20 and the seat 16 extend inwardly past their various ports 14, 24, 26, and 28 and terminate at the inner end of a cylindrical enlargement 36 of the seat bore. Between the groove 30 and the large end of the plug, the opposed surfaces of the plug and seat are in tight sealing engagement and preferably are ground to one another by means well known in the art. Outwardly beyond the O-ring groove 30, the opposed surfaces of the plug 20 and the seat 16, preferably, are spaced apart by relieving the seat, as at 38.

At its smaller end, the plug 20 is provided with a shank 40 that extends outwardly beyond the casing 10 and has a cylindrical inner portion 42 and a flathead outer portion 44. The inner portion 42 has a collar 46 which is secured thereto by a pin 48 which is driven through an aperture in one side of the collar, a corresponding aperture in the shank, and into a blind socket in the other side of the collar. Between the collar 46 and an annular opposed bearing area at the corresponding end of the casing 10 is a resilient washer 50, which, in the position of the parts shown in Figures 1 and 2, is compressed substantially flat between the collar and the bearing area on the end of the casing. The collar may be provided with a lock wing 52 having an aperture therein alignable with a corresponding aperture in a lock wing 54 on the casing 10, so that a padlock may be inserted through the apertures in both lock wings to lock the valve in its closed position. Although the resilient washer 50 is shown as being substantially flat, there is some resiliency left therein, so that should the plug 20 become substantially frozen to its seat 16, the end of the head 44 may be hammered by an appropriate instrument to slightly unseat the plug and free the same for easy turning movements in its seat.

Threaded into the enlarged portion 36 of the seat bore at the large end of the valve seat 16 is a closure plug 56 having an inwardly-extending plunger portion 58 that has an exterior smooth cylindrical surface complementary to the smooth cylindrical surface of the enlarged portion 36 of the seat bore inwardly of the threads 60. The plunger portion 58 of the closure plug 56 is provided with a circumferential packing groove 62, of substantially the same configuration as the seat packing groove 30. Disposed in the groove 62 is a resilient pressure-deformable packing ring 64, of substantially the same configuration as the packing ring 32. Again, the groove 62 is substantially rectangular in radial section and opposed to the smooth cylindrical surface of the enlarged section 36 of the seat bore. Also, the O-ring 64 is of such a size that, when it is positioned in the groove 62, it is compressed somewhat and contacts both the bottom of its groove and the opposed surface of the enlarged section 36 of the seat bore, to thus form an end seal for the seat bore. Inwardly beyond the groove 62, the plunger portion 58 of the closure plug is relieved, as at 66, to provide communication between the groove 62, at the inner side of the ring 64, and a lubricant reservoir 68 defined by the seat bore section 36 and the opposed ends of the valve plug 20 and the closure plug 56.

Figure 3:
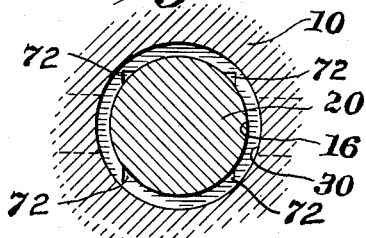
Figure 3 is a fragmentary horizontal sectional view taken on line 3—3 of Figure 1.
Figure 4:
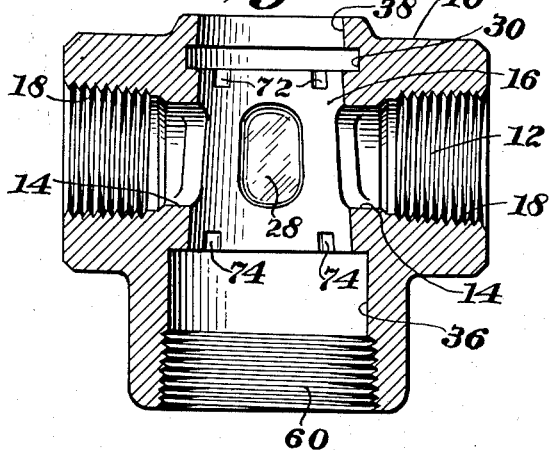
Figure 4 is a sectional view corresponding to Figure 1, but with the valve plug and the closure plug being omitted.
Figure 5:
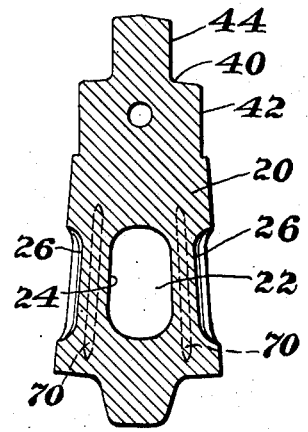
Figure 5 is a vertical sectional view through the valve plug shown in Figures 1 and 2.

Four longitudinal lubricant channels 70 are formed in the surface of the valve plug 20. These channels 70 are substantially equally spaced circumferentially of the plug 20, as shown in Figure 3, but are angularly offset, approximately 45° from the plug ports 24. At one end each lubricant channel 70 terminates short of the packing groove 30 in the valve seat 16, and at its other end each channel 70 terminates short of the end of the sealing surface of the plug 20 that is in engagement with the valve seat at its larger end. Hence, unless otherwise provided for, the longitudinal lubricant channels 70 do not communicate with the lubricant reservoirs 34 and 68. In order to provide such communication, the rim of the inner side wall of the O-ring groove 30 is provided with four substantially equally and circumferentially spaced notches or recesses 72 which extend in the surface of the seat 16 inwardly of the groove 30 a sufficient distance to overlap the end of a corresponding lubricant channel 70 in the valve plug 20 when the valve is in its open or in its closed position. Similarly, at the larger end of the valve seat 16, there are provided four substantially equally and circumferentially spaced notches or recesses 74 in the surface of the valve seat 16 which extend inwardly from the large end of the seat a sufficient distance to overlap the end of a corresponding lubricant channel 70 when the valve is in its open or in its closed position.

It thus will be seen that, when the valve is in its open or closed position, the aforedescribed lubricant reservoirs 34 and 68, the longitudinal lubricant channels 70, and the notches or recesses 72 and 74 form a closed lubricant system. When lubricant is introduced under pressure into this system, it fills the longitudinal lubricant channels 70, the notches 72 and 74, and the lubricant reservoirs 34 and 68, to thus squeeze the O-rings 32 and 64 outwardly into the corners formed by the outer side walls of their grooves 30 and 62, respectively, and the cylindrical surfaces opposed to these grooves. Thus, the compression and deformation of the O-rings 32 and 64 by lubricant pressure, or by the pressure of the fluid being controlled by the valve, forms an extremely tight and effective end seal at each end of the seat 16, and at the same time maintains pressure on the lubricant in the system.

The aforedescribed notches 72 and 74 are narrow enough so that when the plug 20 is initially rotated from either its open or closed position a distance sufficient to expose a lubricant channel 70 to a casing port 14 or a false port 28, the corresponding notches are out of overlapping relationship with the ends of the lubricant channel, to thus interrupt or cut off communication between the lubricant reservoirs 34 and 68 and the lubricant channel. Accordingly, when a longitudinal lubricant channel 70 is exposed to a casing port 14 or false port 28, no pressure exists in such channel, and, consequently, lubricant will not be extruded therefrom into the port to which it is exposed. Therefore, on turning movements of the valve plug, the only lubricant lost from the channels 70 is the small amount occasioned by the wiping action of the sealing surfaces of the valve seat 16 over the channels. Such wiping action serves to spread the lubricant between the opposed sealing surfaces of the valve plug and its seat. When the plug 20 has completed its rotation between open and closed positions of the valve, the notches 72 and 74 and the ends of the lubricant channels 70 are again brought into their overlapping relationship, so that the channels are again subjected to the pressure of the lubricant in the reservoirs 34 and 68. Hence, any lubricant which has been dissipated from the channels by the aforedescribed wiping action will be immediately replenished by lubricant from the reservoirs. Since the amount of lubricant dissipated by such wiping action is extremely small, it will be seen that only a very small amount of lubricant from the reservoirs is needed to replenish the lubricant channels. Accordingly, once the lubricant system has been charged with lubricant under pressure, the pressure will be maintained over a long period of time, even with a great number of operations of the valve. Hence, the valve will be maintained in adequate lubricated condition over prolonged periods of operation and without the necessity of recharging the system with lubricant.

In order to charge the system with lubricant, the closure plug 56 is removed and a quantity of lubricant is placed in the enlarged portion 36 of the seat bore, whereupon the closure plug is rethreaded into the enlarged portion of the seat bore. As the closure plug 56 is screwed inwardly, it develops pressure on the lubricant in the reservoir 68 to force the same throughout the lubricant system, as aforedescribed.

It thus will be seen that the objects of this invention have been fully and effectively accomplished. It will be realized, however, that the specific embodiment shown and described for the purpose of illustrating the principles of the invention is subject to change without departure from such principles. For example, the O-ring groove 30 formed in the valve seat 16 may just as easily be formed in the valve plug 20. In this instance, the longitudinal lubricant channels 70 will be formed in the valve seat 16, while the notches 72 and 74 will be formed in the valve plug 20. Also, it can be seen that the O-ring groove 62 can just as easily be formed in the surface of the enlarged section 36 of the seat bore, with an O-ring disposed therein for rubbing engagement with the plunger portion 58 of the closure plug 56. In this latter type of construction, there should also be some relief provided on the smooth cylindrical surface of the enlarged portion 36 of the seat bore inwardly of the suggested bore groove to provide access thereto by the lubricant in the reservoir 68 for purposes described before. Therefore, this invention includes all modifications encompassed within the spirit and scope of the following claims.

I claim:

1. A rotary plug valve comprising: a casing having a bore defining a plug seat provided with at least one port opening thereto; a plug rotatable in said seat to open and close the valve and having at least one port alignable with said casing port, the opposed surfaces of said plug and seat having sealing engagement at least in a central zone that surrounds said ports; means defining at least one longitudinal lubricant channel in one of said surfaces extending substantially the length of said zone; means sealing one end of said bore; a plunger in and closing the other end of said bore and spaced from and defining with the corresponding end of said plug a lubricant chamber in communication with said channel in at least the open and closed positions of the valve, at least one of the opposite surfaces of said plunger and bore being smooth throughout at least a zone located inwardly of an outer portion of said bore at said other end thereof; means defining a circumferential groove in the other of said opposed surfaces of said bore and plunger; a pressure-deformable resilient packing ring in said groove, said ring when relaxed being non-complementary to the outer side wall of said groove and of sufficient size in radial section to contact both the bottom of said groove and said smooth surface; means providing communication between said chamber and said groove at the inner side of said ring therein; means for forcing said plunger inwardly of said chamber and for retaining said plunger in said bore; and means independent of said plunger for retaining said plug in said seat.

2. The structure defined in claim 1 in which the plunger comprises a plug threadedly engaging the outer portion of the said bore.

3. The structure defined in claim 1 in which the channel terminates short of the end of the said seat adjacent the said plug end, and including recess means in one of the opposed surfaces of the plug and seat for providing, in the open and closed positions of the valve, communication between said channel and the chamber, and for interrupting said communication when said channel is exposed to one of the said ports by rotation of said plug, said recess means being non-exposable to either of said ports by said rotation.

4. The structure defined in claim 1 in which the means sealing the said one end of said bore comprises means defining a circumferential packing groove in one of the said opposed surfaces of the plug and the seat adjacent said one bore end, a pressure-deformable resilient packing ring in said groove, said ring when relaxed being non-complementary to the outer side wall of said groove and of sufficient size in radial section to contact both the bottom of said groove and the other of said surfaces, the said channel being in communication with said groove at the inner side of said ring therein at least in the open and closed positions of the valve.

5. The structure defined in claim 4 in which the channel terminates short of the groove, and including recess means in one of the opposed surfaces of the plug and seat for providing, in the open and closed positions of the valve, communication between said channel and said groove, and for interrupting said communication when said channel is exposed to one of the said ports by rotation of said plug, said recess means being non-exposable to either of said ports by said rotation.

6. A rotary plug valve comprising: a casing member provided with a ported plug seat; a ported valve plug member rotatable in said seat, the opposed surfaces of said plug and seat having sealing engagement in at least a central zone that surrounds the seat and plug member ports; means defining at least one longitudinal lubricant channel interrupting at least one of said surfaces in said zone and forming at least a part of a closed lubricant system; means defining a bore in one of said members; a lubricant charging plunger mounted for axial adjustment in and closing one end of said bore and defining, at least in part therewith, a lubricant chamber in communication with said system; means defining a circumferential groove in one of the opposed surfaces of said bore and plunger, the other of said latter surfaces being smooth-walled for a portion of its length opposite said groove; a pressure-deformable resilient packing ring in said groove, said ring, when relaxed, being non-complementary to the outer side wall of said groove and of sufficient size in radial section to form a seal between the bottom of said groove and said opposite smooth-walled surface; and means independent of said plunger for retaining said plug member in said seat.

7. The structure defined in claim 6 in which the plunger is threadedly engaged with a portion of said bore located outwardly of the seal effected by the packing ring.

References Cited in the file of this patent

UNITED STATES PATENTS

| | | |
|---|---|---|
| 1,365,116 | Martin | Jan. 11, 1921 |
| 1,915,068 | Milliken | June 20, 1933 |
| 2,041,669 | Whittle | May 19, 1936 |
| 2,208,870 | Milliken | July 23, 1940 |
| 2,216,150 | Wilkins | Oct. 1, 1940 |
| 2,255,182 | Nordstrom | Sept. 9, 1941 |
| 2,289,720 | Mueller | July 14, 1942 |
| 2,391,278 | Stark | Dec. 18, 1945 |
| 2,616,657 | Martin | Nov. 4, 1952 |
| 2,653,791 | Mueller | Sept. 29, 1953 |
| 2,693,815 | Gould | Nov. 9, 1954 |